United States Patent
Ducharme et al.

(10) Patent No.: US 6,956,500 B1
(45) Date of Patent: Oct. 18, 2005

(54) REAL-TIME RESIDENTIAL ENERGY MONITOR

(75) Inventors: Alfred D. Ducharme, Orlando, FL (US); Jason M. Eichenholz, Orlando, FL (US); Paul A. Valentine, Deland, FL (US)

(73) Assignee: M & M Systems, Inc., Ormond Beach, FL (US)

(*) Notice: Subject to any disclaimer, the term of this patent is extended or adjusted under 35 U.S.C. 154(b) by 476 days.

(21) Appl. No.: 10/306,952

(22) Filed: Nov. 29, 2002

(51) Int. Cl.[7] .......................................... G08C 15/06
(52) U.S. Cl. .......................... 340/870.02; 340/870.07; 340/870.11; 705/412; 348/207.99; 250/215
(58) Field of Search ..................... 340/870.02, 870.07, 340/870.11; 705/412; 348/207.99; 250/215

(56) References Cited

U.S. PATENT DOCUMENTS

| | | | |
|---|---|---|---|
| 4,204,115 A | 5/1980 | Boldridge, Jr. | ............. 250/227 |
| 4,415,853 A | 11/1983 | Fisher | .......................... 324/74 |
| 4,680,740 A | 7/1987 | Treptow | ..................... 364/525 |
| 4,697,181 A | 9/1987 | Swanson | ............... 340/870.02 |
| 4,803,632 A | 2/1989 | Frew et al. | ............. 364/464.04 |
| 5,214,587 A | 5/1993 | Green | .................... 364/464.04 |
| 5,506,404 A * | 4/1996 | Milan-Kamski | ....... 250/231.14 |
| 5,627,462 A | 5/1997 | Whitehead | ................... 324/103 |
| 5,635,895 A | 6/1997 | Murr | ...................... 340/310.01 |
| 5,644,139 A | 7/1997 | Allen et al. | .................. 250/557 |
| 5,673,331 A | 9/1997 | Lewis et al. | ................. 382/100 |
| 5,874,903 A | 2/1999 | Shuey et al. | ............ 340/870.02 |
| 5,902,998 A * | 5/1999 | Olson et al. | ........... 235/472.01 |
| 5,924,051 A | 7/1999 | Provost et al. | ................ 702/61 |
| 6,369,719 B1 | 4/2002 | Tracy et al. | ............ 340/870.02 |
| 6,622,097 B2 * | 9/2003 | Hunter | ......................... 702/61 |
| 2003/0193405 A1 * | 10/2003 | Hunt et al. | ............ 340/870.02 |
| 2004/0027253 A1 * | 2/2004 | Marsh et al. | ........... 340/870.02 |

* cited by examiner

Primary Examiner—Timothy Edwards, Jr.
(74) Attorney, Agent, or Firm—Brian S. Steinberger; Law Offices of Brian S. Steinberger, P.A.

(57) ABSTRACT

An inexpensive energy monitoring device and method for measuring energy usage and power costs in real time. The invention can include an external type digital battery powered camera that can be mounted away from and adjacent to the outdoor utility meter on a rotatable arm, which can send data signals to remote locations indoors using wireless such as an RF signal to a detector/display inside the residence. The indoor unit can be programmed to display desirable energy status information to a home owner on power usage and power costs on a daily bases, monthly bases, and yearly bases so that the home owner can budget energy usage and energy costs as needed. A shield can also be used with device and method for shielding power meters from adverse weather conditions.

26 Claims, 9 Drawing Sheets

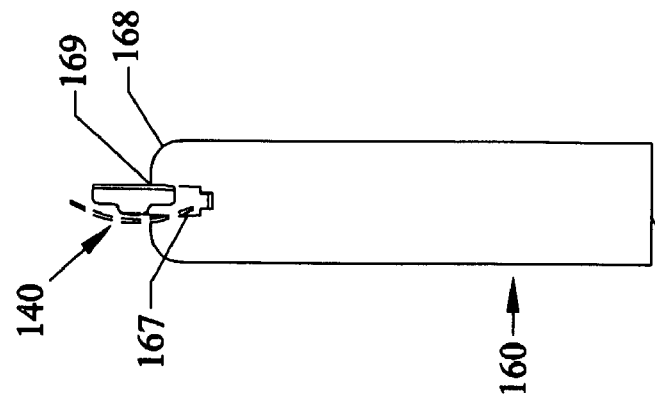
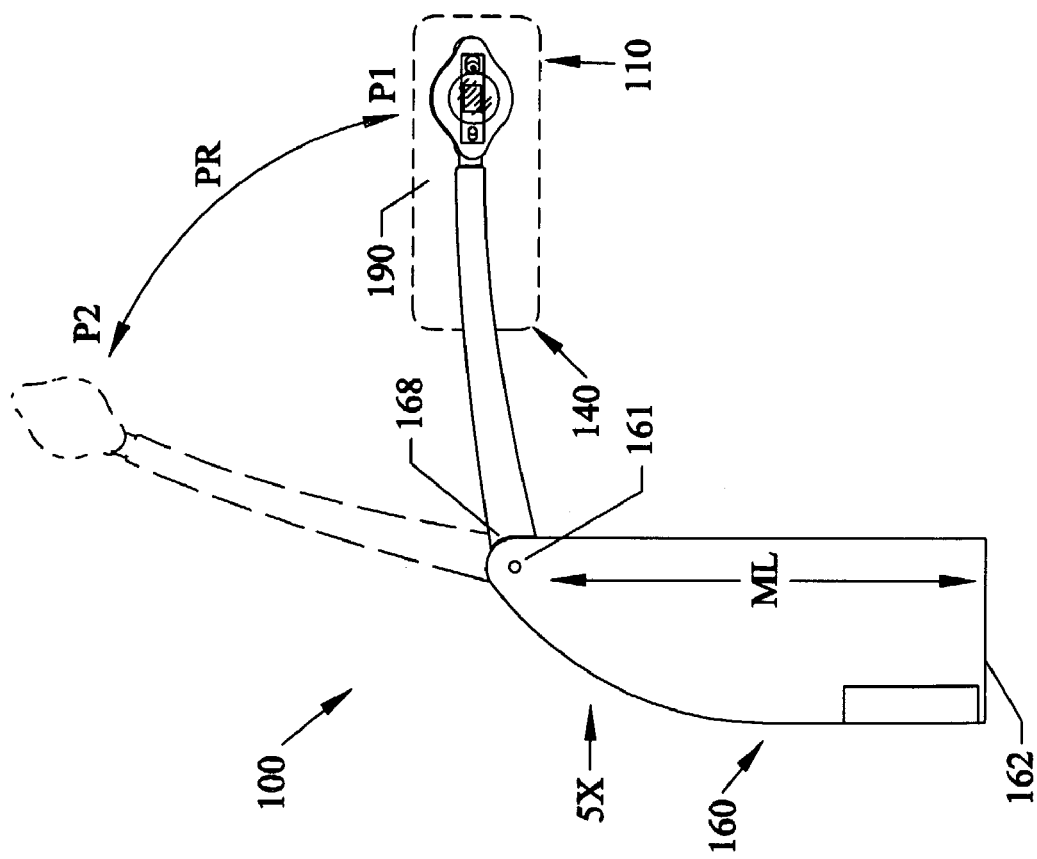

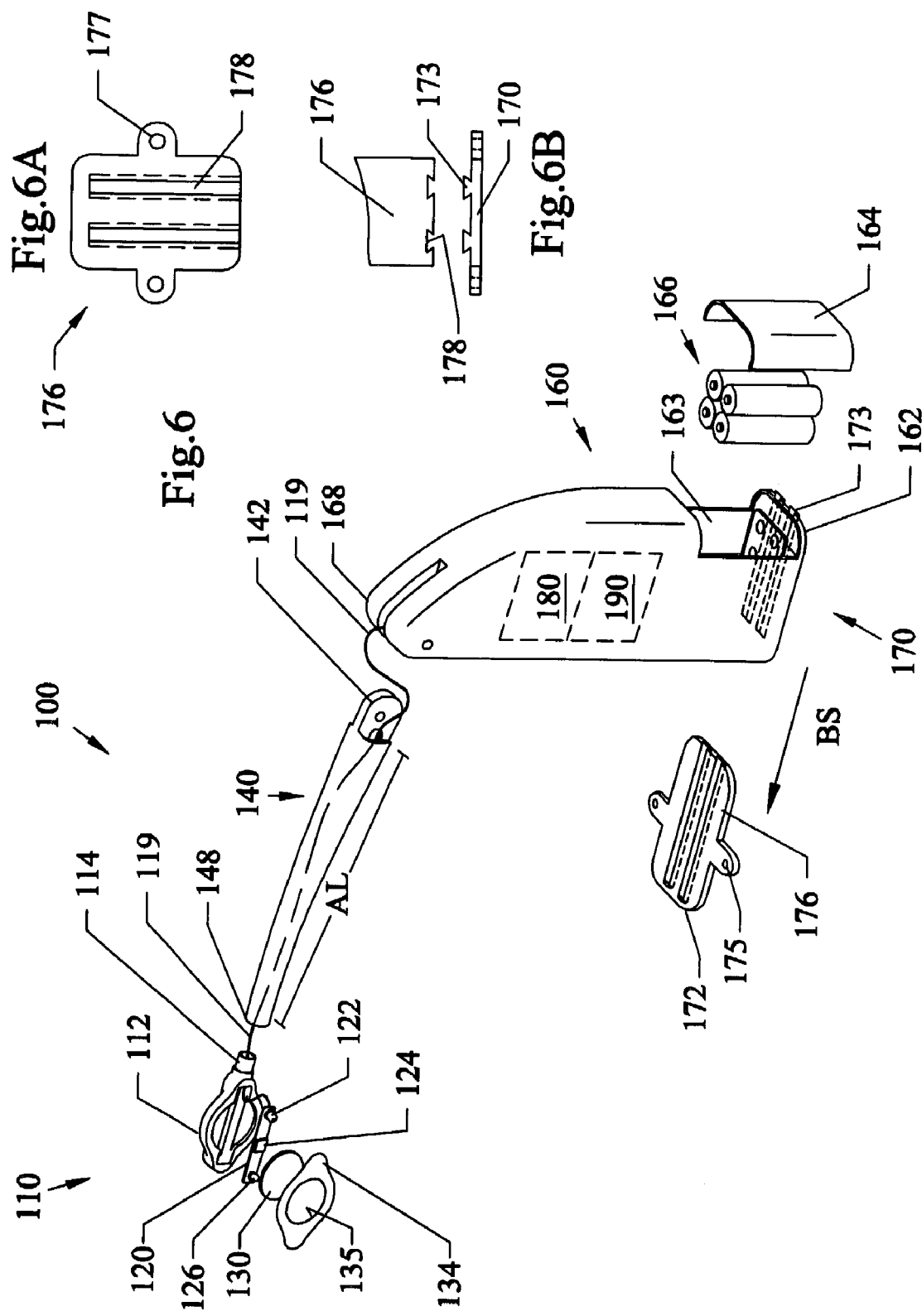

REAL-TIME RESIDENTIAL ENERGY MONITOR

This invention relates to optical sensors, and in particular to meter reader systems and methods having camera type sensors mounted adjacent and separate from a utility meter such as externally located electric and water meters, for accurately reading the utility meters and transmitting up to date information in a wireless manner into an adjacent business or residence for real-time energy usage monitoring and budget status.

BACKGROUND AND PRIOR ART

Homeowners have had a long felt need to monitor the daily energy consumption. Currently homeowners adjust their energy consumption by their past energy bills, such as evaluating a previous month's electric bill. It is very difficult for consumers to make immediate changes to the energy consumption by having to wait to the end of the month when they get a monthly bill in order adjust their energy usage.

Various patents have been proposed over the years. See for example U.S. Pat. No. 4,204,115 to Boldridge, Jr.; U.S. Pat. No. 4,415,853 to Fisher; U.S. Pat. No. 4,680,704 to Konicek et al.; U.S. Pat. No. 4,697,181 to Swanson; U.S. Pat. No. 4,803,632 to Frew et al.; U.S. Pat. No. 5,214,587 to Green; U.S. Pat. No. 5,627,462 to Whitehead, Jr.; U.S. Pat. No. 5,635,895 to Murr; U.S. Pat. No. 5,644,139 to Allen et al.; U.S. Pat. No. 5,673,331 to Lewis et al.; U.S. Pat. No. 5,874,903 to Shuey et al.; U.S. Pat. No. 5,880,464 to Vrionis; U.S. Pat. No. 5,924,051 to Provost et al.; U.S. Pat. No. 6,369,719 to Tracy et al. These proposed devices have many problems.

For example, many of the devices require attaching a monitoring device directly to the glass type cover of the utility meter, or require portions of the monitoring device be inserted inside the utility meter. See for example Boldridge, Jr. '115 and Green '587. A problem with these devices is that they are generally illegal in many jurisdictions which prohibit utility meters from being tampered with by obstructing and/or modifying the utility meter box itself. Thus, most of these devices cannot be legally used. Furthermore, the cost of the device components and extra labor time to install these devices makes them further impractical to be used. Finally, many of these devices can obstruct the rotating disk so that meter readers are delayed from taking a reading when needed or emergency personnel cannot remove the meter if required during an emergency.

Many other monitoring devices rely on reading the black line on the rotating meter wheel. See for example Whitehead, Jr. '462. These devices have problems such as the alignment of the black mark line so that it can be read. Additionally, these devices have inherent problems for false readings, and the like. Furthermore, these devices do not give real-time readings since the monitor has to wait until the black line on the rotating disk passes by the sensor.

Furthermore many of these consumer monitor devices referred to above also require installation by electricians and/or by utility company employees. Furthermore, these hardwired systems can require that power to the residence be turned off during installation of the monitoring device. Still furthermore, many of these devices can malfunction during power shortages, to the residence.

Portable proposed devices have other problems, For example, the portable monitoring devices are limited to professional meter readers, and cannot be adapted for residential use, and do not allow for displaying power usage, history usage, and projected future usage. See for example Frew et al. '632. Thus, there exists the need for solutions to the above problems with the prior art.

SUMMARY OF THE INVENTION

The first objective of the present invention is to provide an energy monitor system which allows homeowners to monitor instantaneous power usage, history and projected future energy usage.

The second objective of the present invention is to provide an energy monitor system where power usage can be determined instantaneously.

The third objective of the present invention is to provide an energy monitor that does not require installation by electrician or power company employee.

The fourth objective of this invention is to provide an energy monitor where installation does not require power to the home to be interrupted.

The fifth objective of the present invention is to provide an energy monitor having a wireless interface that allows indoor unit to be mounted in a centralized, conspicuous location in the home so all family members can become more aware of power usage.

The sixth objective of the present invention is to provide an energy monitor having a display that allows for "at a glance" indication of whether the homeowner is on-track to meet his monthly energy cost goal.

The seventh objective of the present invention is to provide an energy monitor with a sensor that is easy to install and align due to lens design and use of alignment light emitting diodes(LED's).

The eight objective of the present invention is to provide an energy monitor that does not obstruct a utility meter to allow for easy access by the power company meter reader or emergency personnel.

The ninth objective of the present invention is to provide an energy monitor that can be used to monitor different types of meters having rotating disc wheels.

A preferred embodiment of the invention can include an exterior assembly having a digital type camera mounted on an end of an arm above and separate from a power meter such as a glass cupped power meter. The camera can detect velocity data of the rotating wheel disk on the power meter, and send velocity data by a wireless transmission such as by RF, and the like, to an indoor display monitor inside of a building, such as a home. There can be 2–4 keys for user input and the LCD will display a "heartbeat" symbol to indicate that the unit is receiving information from the power meter sensor.

The indoor display unit can compute and display daily, weekly, monthly and yearly energy cost as well as current demand in dollars. A budget feature will allow the operator to set limits on monthly power usage to help costs from rising too high. Green and red LED's can be used to indicate whether the energy cost is below or above the budget amount. The entire unit can be designed to sell for a retail price of less than $50 as a home owner self installation kit, and can be used with different energy type meters.

Further objects and advantages of this invention will be apparent from the following detailed description of a presently preferred embodiment which is illustrated schematically in the accompanying drawings.

BRIEF DESCRIPTION OF THE FIGURES

FIG. 4 is a top view of the monitor on rotatable arm and mount of FIG. 2 along arrow 4Y.

FIG. 5 is an end view of the mount and arm of FIG. 4 along arrow 5X.

FIG. 6 is an exploded view of the monitor, arm and mount of the preceding figures.

FIG. 6A shows a wall plate for hanging the base mount portion of FIG. 6 thereon.

FIG. 6B shows a side view of the wall plate and base mount portion of FIGS. 6, 6A.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
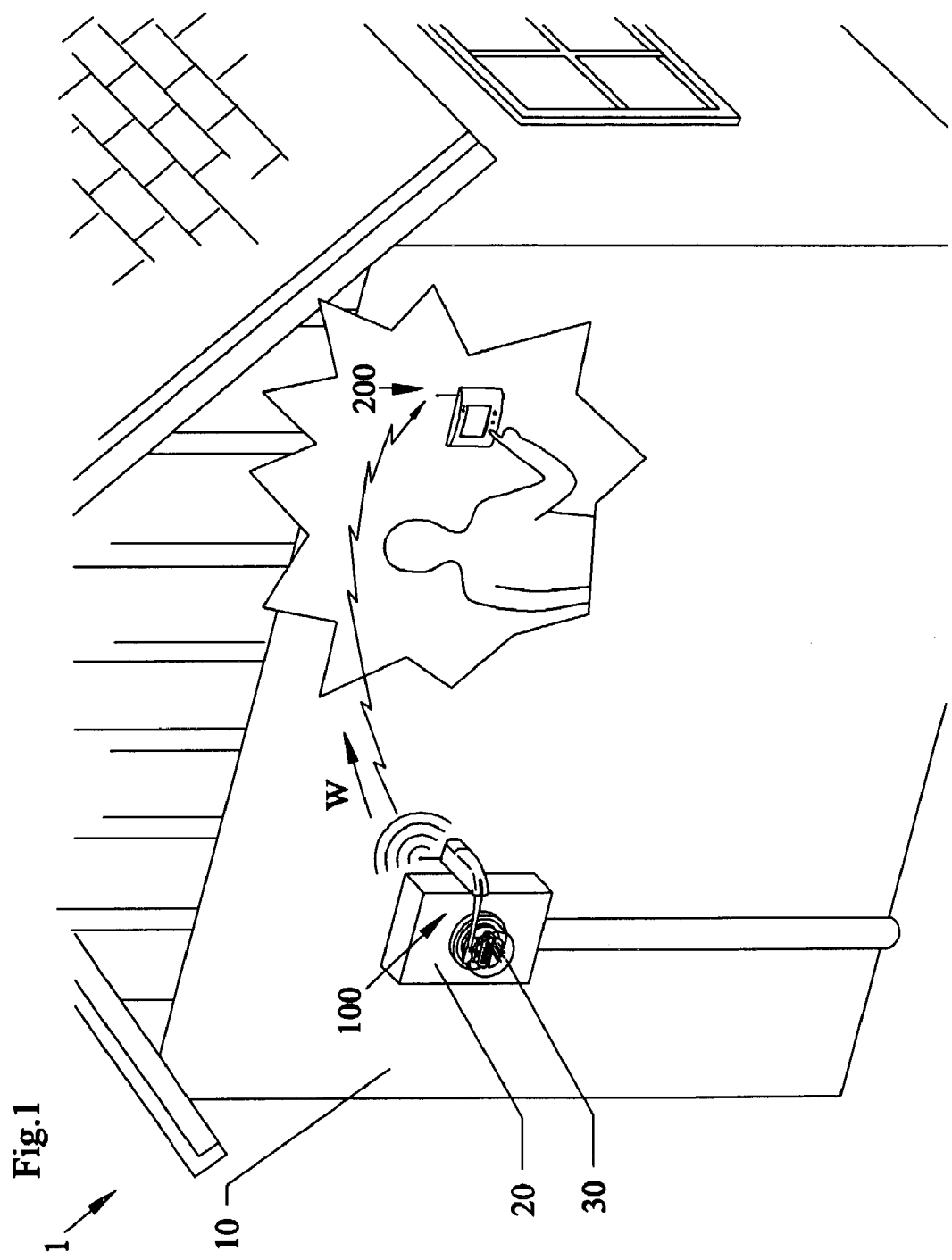
FIG. 1 shows a perspective exterior view of a novel power meter monitor attached to a rotatable arm with mount adjacent to a power meter and indoor display receiver/monitor.
Figure 2:
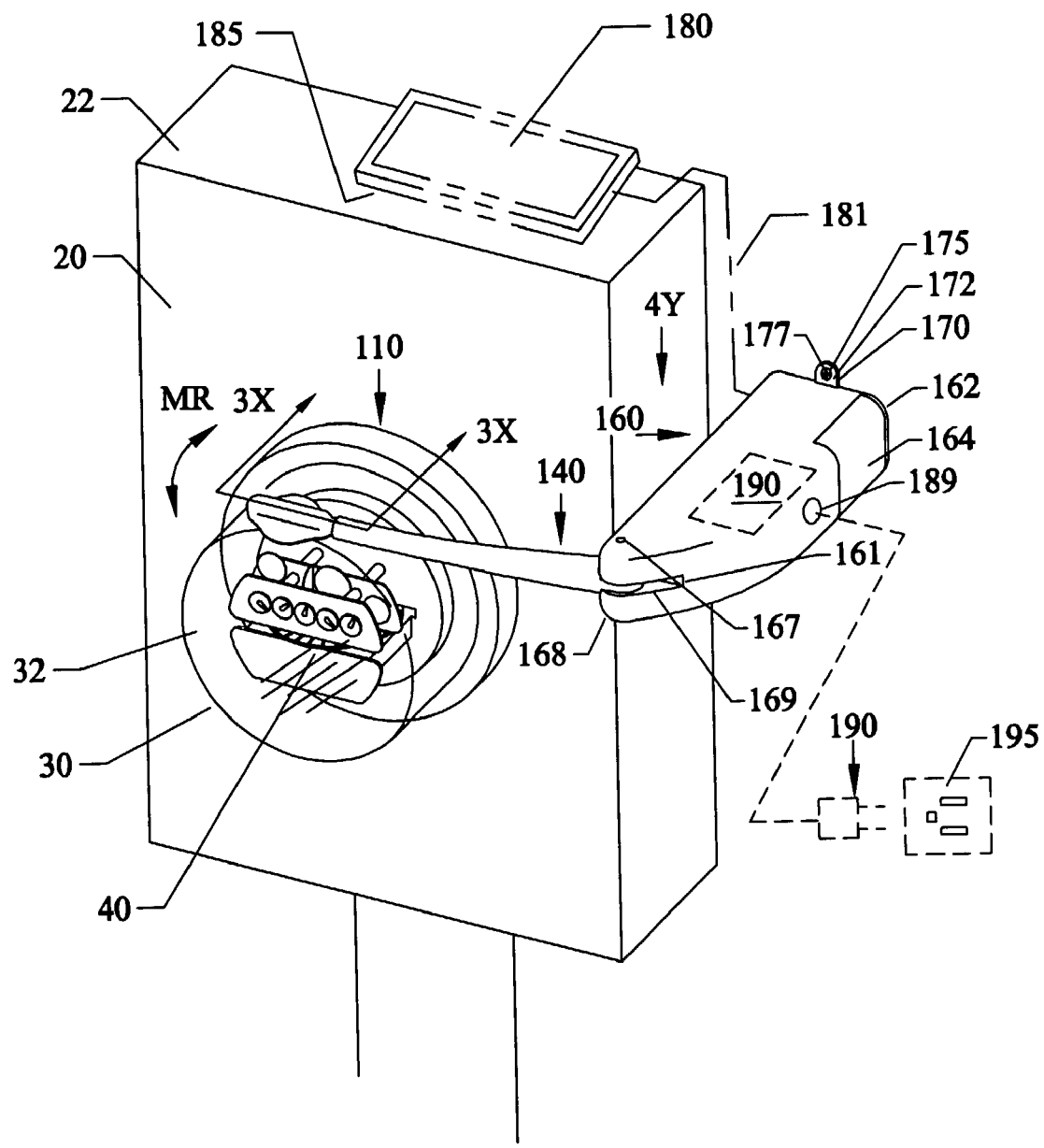
FIG. 2 is an enlarged perspective view of the meter monitor and arm of FIG. 1 adjacent to the power meter.
Figure 3:
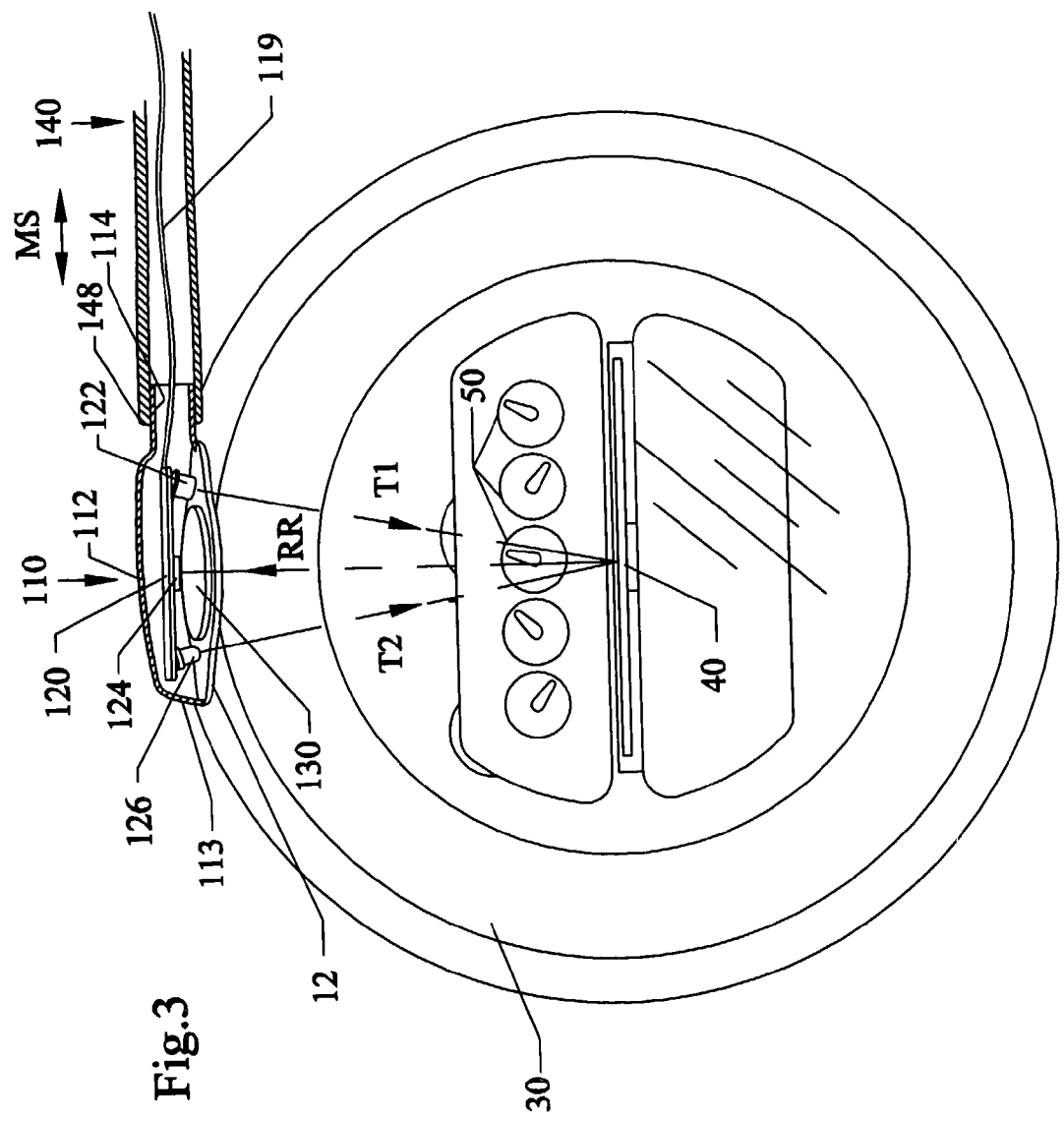
FIG. 3 is a front cross-sectional view of the monitor and arm of FIG. 2 along arrow 3X.

FIG. 1 shows a perspective exterior view of a novel outdoor monitor unit assembly 100 that can include power meter monitor 110 attached to a rotatable arm 140 with wall mount 160 adjacent to a power meter 20, 30 and cut-away view of an indoor display receiver/monitor 200. FIG. 2 is an enlarged perspective view of the meter monitor 110 and arm 140 of FIG. 1 adjacent to the power meter 20, 30. FIG. 3 is a front cross-sectional view of the meter monitor 110 and arm 140 of FIG. 2 along arrow 3X. FIG. 4 is a top view of the meter monitor 110 on rotatable arm 140 and wall mount 160 of FIG. 2 along arrow 4Y. FIG. 5 is an end view of the wall mount 160 detached from the wall 10 and arm 140 of FIG. 4 along arrow 5X. FIG. 6 is an exploded view of the meter monitor 110, arm 140 and wall mount 160 of the preceding figures.

Referring to FIGS. 1, 2 and 4–6, the novel outdoor monitor assembly 100 can be mounted to a wall adjacent but not touching a power meter that can include an outdoor electricity meter 30 mounted to an exterior box on the outer wall 10 of a building 1 such as a home, and the like. The wall mount 160 can include an end 162 having a bracket portion 170 such as a perpendicular flange having a flat surface 172 with a through-hole 175 for allowing a fastener(s) 177, such as but not limited to a screw, and the like to fasten the wall mount 160 to the wall surface 10 of the building 1.

FIG. 6A shows a wall plate 176 for hanging the bracket portion 170 of FIG. 6 thereon. Wall plate 176 can include fastening holes for allowing fasteners such as but not limited to screws, and the like, to prefasten wall plate 176 to the exterior surface of an outer wall of a home type structure, and include a female type-groove portion 178, that can mateably receive the male type protruding portion 173 protruding from an under portion of bracket 170 by being slid in the direction of arrow BS(as shown in FIG. 6). FIG. 6B shows a side view of the wall plate and base mount portion of FIGS. 6, 6A.

Referring to FIGS. 1, 2, 4–6, wall mount 160 can have a length ML that between wall mounting end 162 and arm mounting end 168 so that arm mounting end 168 extends further away from wall 10 than the front face window 32 of the meter 30. Inside wall mount 160 can be a compartment 163 for allowing a power supply 166 such as but not limited to a four pack of 1.5 volt batteries, to be stored in side, and held in place by a snapable door 164. Replaceable power supply 166 can be used to power the meter monitor 110 which will be described in detail later. Additionally, a solar panel 180 can be mounted by removable fasteners 185, such as but not limited to hook and loop fasteners, and peel and stick tape, to the top surface 22 of meter box 20. During clear daylight hours, solar panel 180, such as those found on calculators, and the like, can be used to recharge power supply 166 through line 181. Alternatively, the meter monitor 110 can be powered by a power cord plug 190 that can be attached to an exterior outlet 195 on the building 1. On the outer end 168 of wall mount 160 can be a slit opening 169 for allowing a connecting end 142 of arm 140 to be connected to outer end 168 of wall mount 160 by a pin 167.

Referring to FIGS. 2–6, arm 140 can rotate in the direction of double arrow PR from position P1 which is substantially perpendicular to wall mount 160, with an interior wall portion 161 inside slit opening 169 limits the rotation of arm 140 to position P1. Rotating arm 140 in the direction of arrow P2 allows the meter monitor attached to the second end 148 of arm 140 to extend outward away from meter 30. Arm 140 can be positioned that it is slightly above meter 30 so as not to block the actual meter dials 50 and rotating wheel 40 of the meter itself. The length AL of the arm 140 can be long enough to allow the meter monitor 110 to be positioned above the rotating wheel 40 of power meter 30. Attached to the outer end 148 of rotatable arm 140 can be the meter monitor 110. Unlike prior art devices the novel monitor 110 does not interfere with the power meter 30 either directly or indirectly. For example, physically reading the actual meter dials 50 will not be obstructed, and no penetration and/or insertion is done into the power meter box 20 and/or meter 30 either directly or indirectly.

The meter monitor 110 can be rotated up to 180 degrees within the outer end 148 of the rotatable arm(as shown by double arrows MR FIG. 2) to allow the wall mount 160 to be mounted to the right or left side of the meter box 20. The meter monitor 110 can be rotated a smaller amount to compensate for the mounting of the base unit on a home with siding. In addition, the meter monitor 110 can be slid in or out of the outer end 148 of the rotatable arm 140(as shown by double arrows MS FIG. 3) to allow positioning of the monitor 110 over any portion of the rotating disk wheel 40 which is not obstructed by internal mechanisms.

Referring to FIGS. 1–6, meter monitor 110 can include a narrow neck male portion 114 that attaches monitor 110 to arm 140 though a receiving female slot in outer end 148 of arm 140. monitor 110 can include a rear wall portion 112 that can have an oval shape with inwardly facing cup shaped side walls 113 for supporting a panel 120 which functions as both a circuit board and support for an infrared light emitting diode (IR LED) 122, a red light emitting diode(R LED) 126, and a CCD camera 124 therebetween. IR LED 122 and R LED 126 are positioned so that light beams T1, T2 are respectively emitted toward an edge of rotating wheel 40. A focusing lens 130 can be used for focusing the reflecting light RR from rotating wheel 40 to be read by CCD camera 124. Lens 130 is intended to focus the image of the rotating disk wheel 40 onto the CCD optical sensor 124. A lens mount 134 with an opening for the lens 130 can be attached to the side walls 113 of monitor 110. Additionally, the size of the monitor 110 can be built large enough to provide a degree of protection from falling rain and dirt.

IR LED 122 and R LED 126 and CCD camera 124 can together form a digital type sensor camera that can take approximately 100 and 2300 frame pictures per second of the meter rotating disk to detect disk rotation and velocity.

The meter monitor 110 of the invention can include an optical mouse sensor such as but not limited to an Agilent ADNS-2051 to detect disk rotation velocity. The lens 130 can be used to image the surface of the rotating disk 40 on to a CMOS 16×16 pixel imaging array included in the ADNS-2051 IC.

The wall mount 160 and arm 140 and backing portion 112, and connector neck portion 112 of monitor 110 can be formed from injection molded plastic, and the like, or rust resistant metal and the like, and be sealed against moisture penetration.

Inside the wall mount 160 can be a microprocessor 180 such as those found in personal digital assistants (PDA) and the like which can read data information by line 119 from the CCD optical sensor 124, pre-process the data into velocity information. The microprocessor 180 can additionally encrypt data for the transmitter portion 190. The wireless transmitter portion 190 can be a radio frequency(RF) having a frequency and power level transmission band that has been approved by FCC for short-range transmission. Alternatively, the wireless transmitter portion can include other types of signal transmitters such as but not limited to ultrasonic, radar, and the like, that sends a wireless signal W to interior monitor unit 200.

Referring to FIG. 4, an optional roof shield 140 such as bent plastic, and the like, can be mounted to an upper surface of arm 140 and monitor 110 so as to form a protective shield for these components as well as for the meter(30 FIGS. 1, 2) from potentially harmful weather conditions such as rain, snow, and the like.

Figure 7:
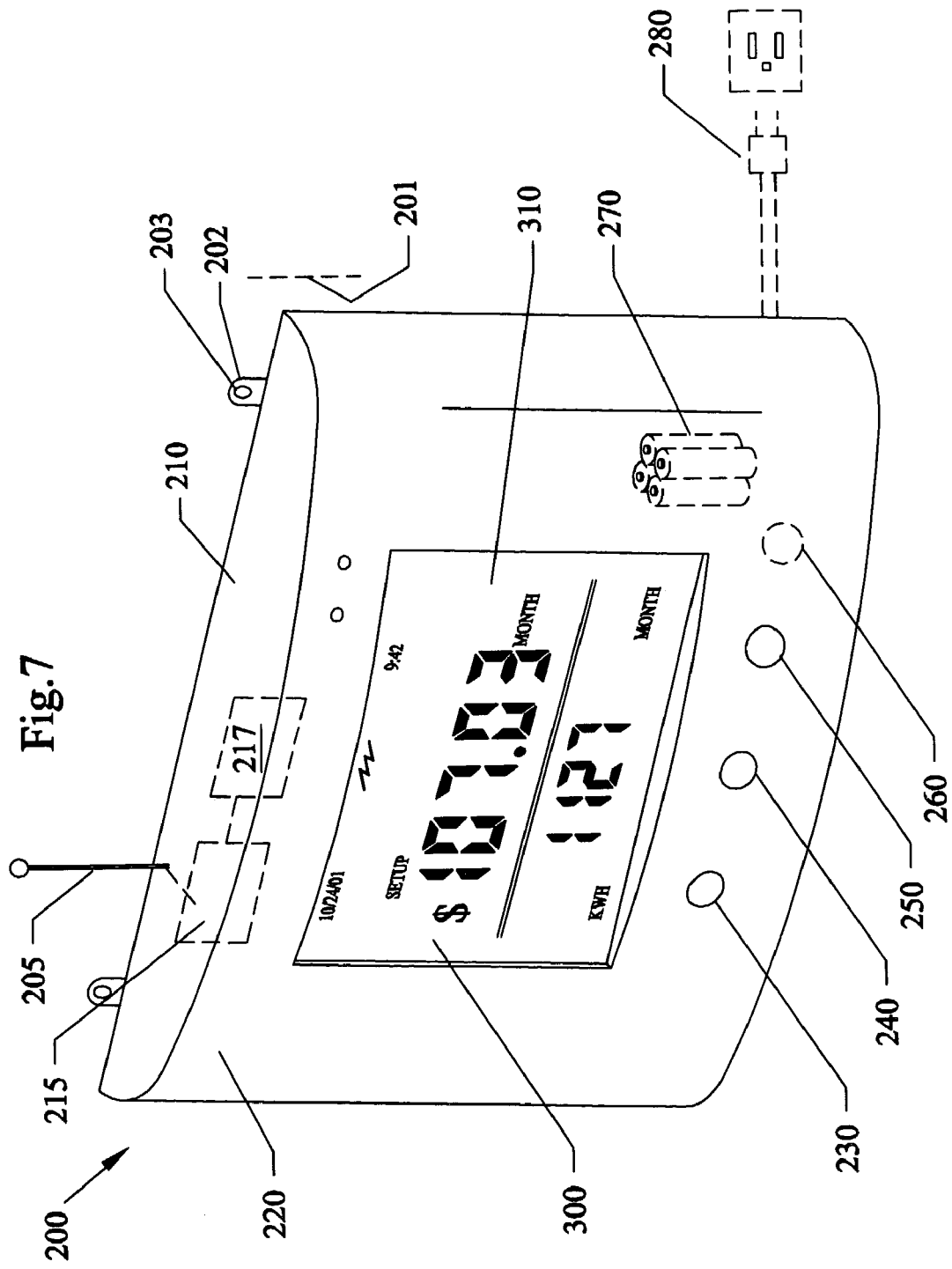
FIG. 7 is a perspective view of the indoor receiver/monitor of FIG. 1.

FIG. 7 is a perspective view of the indoor receiver/monitor 200 of FIG. 1, which can include an interior wall mounted box 210 that can be mounted to an interior wall surface 201 by a hook bracket(s) 203 that uses removable fastener(s) 203 such as but not limited to screws and the like. Inside box 210 can be an RF receiver 215 and programmable minicomputer 217 such as those used with a PDA (personal digital assistant), and the like. The interior processor 217 can be used to read and decrypt the wireless data transmission W, for display on the LCD screen 310.

As described above, the screen panel 300 on a front portion 220 of the box can have a liquid crystal display (LCD) 310 that shows various screens that can be triggered by display buttons such as a status screen button 230, setup screen button 240, and adjust button 250. The interior wall mounted box 210 can be powered by replaceable batteries 270 and/or by an AC 120 volt wall outlet plug 280. The indoor receiver/monitor 200 can have screen dimensions being approximately 4 inches by approximately four inches so that the entire unit 200 is not obtrusive and can be sized to be no larger than a typical intercom used in homes.

Although three buttons 230–250 are shown, less or more buttons can be used as needed and selected by the user of the invention. Green and red LED's can also be used in the various display screens to indicate whether the energy cost is below or above the budget amount.

Figure 10:
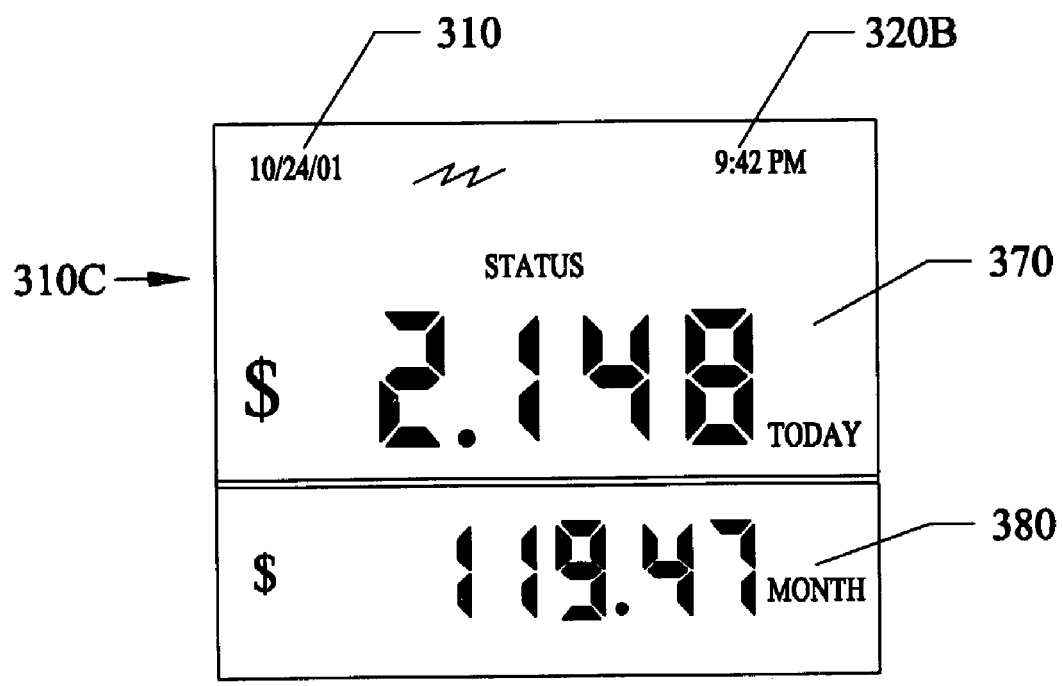
FIG. 10 shows an exemplary status screen for the receiver/monitor of FIGS. 1 and 7.

FIG. 10 shows an exemplary status screen for the receiver/monitor of FIGS. 1 and 7. Referring to FIGS. 1, 7 and 10, depressing status button 230 can provide an LCD display 310C that shows the current status in an LCD readout 370 of the power usage in terms of power costs in the last 24 hours (for the current day), as well as an LCD display 380 of the power costs so far that month. In the example shown in FIG. 10 electrical power usage is two dollars and 14.8 cents on Oct. 24, 2001(310) as of 9:42 pm (320B). By depressing status button 230 repeatedly the lower portion of the status screen 380 can cycle through the available energy data as follows: current week, current month, current year, last week, last month and last year.

Figure 8:
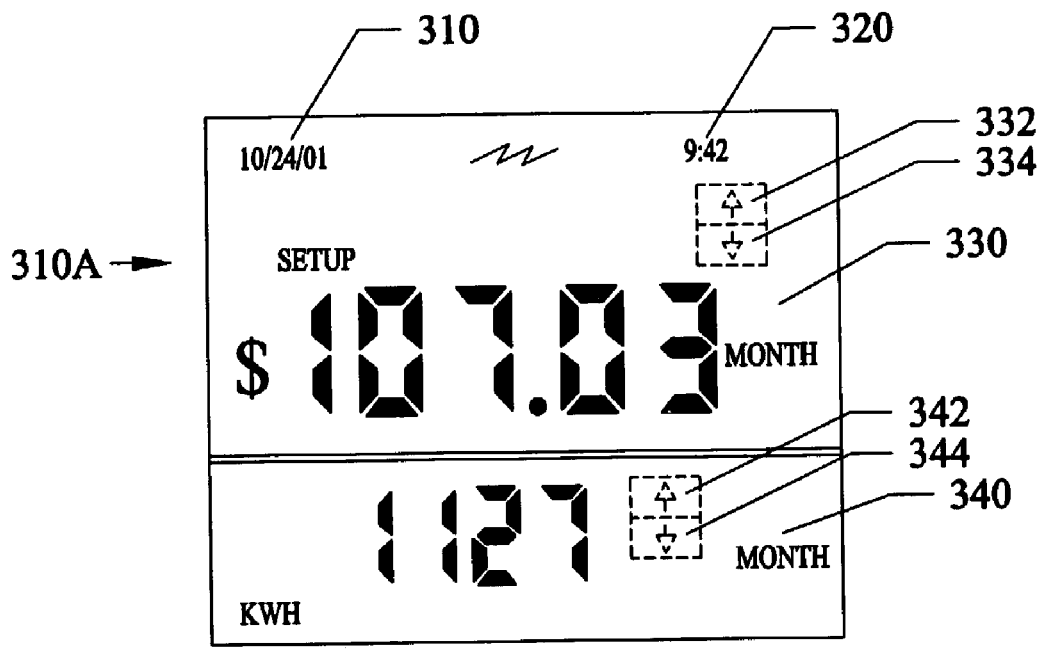
FIG. 8 shows an exemplary setup screen for the receiver/monitor of FIGS. 1 and 7.

FIG. 8 shows an exemplary setup screen 310A for the receiver/monitor 200 of FIGS. 1 and 7. Referring to FIGS. 1, 7 and 8 depressing setup button 240 can provide an LCD display having month, date and year 310, current time of day 320, one month's energy cost 330 and corresponding kWh usage 340. The user can program setup data by depressing adjust button 250, to scroll through the numbers 0–9 on each field arcade style. The number being changed will be identified by the number flashing on and off. Once the number is correct the user will depress the status button 230 to move to the next field/number. The setup screen will allow the date data 310 to be changed first, then the time of day 320 to be entered, then one month's energy cost 330 and finally the corresponding kWh value 340. Once all entries have been completed depressing the setup button 240 will save the entered information and move the user to the budget screen depicted in FIG. 9.

Figure 9:
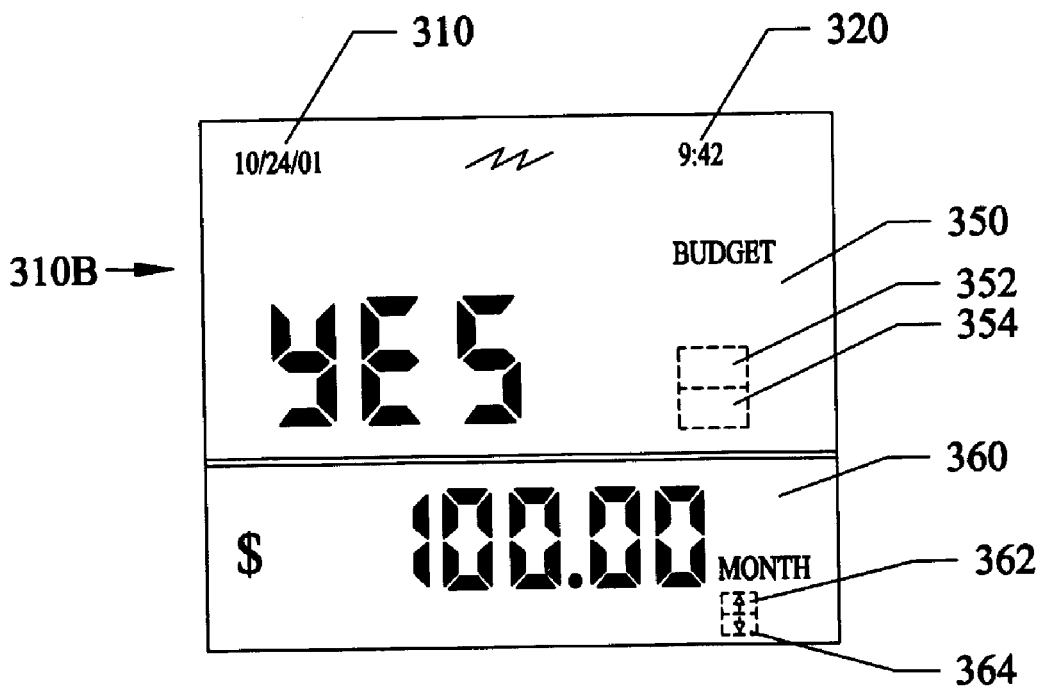
FIG. 9 shows an exemplary budget screen for the receiver/monitor of FIGS. 1 and 7.

FIG. 9 shows an exemplary budget screen 310B for the receiver/monitor 200 of FIGS. 1 and 7. Referring to FIGS. 1, 7 and 9, depressing setup button 240 when the user is on the setup screen 310A can provide an LCD display 310B that allows a budget entry to be used with the monitor. The budget screen will allow the budget mode 350 to be activated or deactivated by displaying the word YES or NO. The budget screen will also allow entry of a desired maximum monthly energy bill. Once the budget screen is entered depressing adjust button 250 will cycle the budget mode enable to YES or NO. The status button 230 can then be depressed to move the user to the monthly budget field were depressing adjust button 250 will scroll through the numbers 0–9 on each field arcade style. The number being changed will be identified by the number flashing on and off. Once the number is correct the user will depress the status button 230 to move to the next field/number until the complete budget number is entered. This method can allow the user to insert a monthly budget amount to the receiver/monitor 200. For example, a $100.00 monthly amount can be set into the monitor 200 so that the user can try to achieve power usage within that set amount per month. Once all entries have been completed depressing the setup button 240 will save the entered information and move the user back to the main status screen depicted in FIG. 10. Note that while on the budget screen the current date 310 and time of day 320 entered on the setup screen 310A will be displayed but cannot be changed. Once enabled the budget mode will allow the system to provide feedback to the user as to whether they are on track to meet their monthly energy bill goals. The receiver/monitor 200 can use green and red LEDs to indicate whether the user is currently under or over the entered monthly budget.

An optional version of the screen panel 300 will now be described in reference to FIGS. 7–10 where on a front portion 220 of the box can have a touch screen liquid crystal display(LCD) 310 that shows various screens that can be triggered by display buttons such as a setup screen button 230, budget screen button 240, and status screen button 250. FIG. 8 shows an exemplary setup screen 310A for the receiver/monitor 200 of FIGS. 1 and 7. Referring to FIGS. 1, 7 and 8 depressing status button 230 can provide an LCD display having month, date and year 310, current time of day 320. The user can program setup data by depressing buttons 332, 334 respectively, to raise or lower a current monthly power bill to date, and depressing buttons 342, 344, respectively, to raise and lower to the current month and day.

FIG. 9 shows an exemplary budget screen 310B for the receiver/monitor 200 of FIGS. 1 and 7. Referring to FIGS. 1, 7 and 9, depressing budget button 240 can provide an LCD display 310B that allows a budget entry to be used with the monitor. Depressing screen button 352 can allow the budget function to be activated, and depressing screen button 354 can deactivate the budget function. Up and down screen buttons 362 and 364 can allow the user to insert a monthly budget amount to the receiver/monitor 200. For example, a $100.00 monthly amount can be set into the monitor 200 so that the user can try to achieve power usage within that set amount per month. Note that current month, day and year 310 as well as current time 320 can be continuously displayed on budget screen 310B.

FIG. 10 shows an exemplary status screen for the receiver/monitor of FIGS. 1 and 7. Referring to FIGS. 1, 7 and 10, depressing status button 250 can provide an LCD display 310C that shows the current status in an LCD readout 370 of the power usage in terms of power costs in the last 24 hours(for the current day), as well as an LCD display 280 of the power costs so far that month. In the example shown in FIG. 10 electrical power usage is two dollars and 14.8 cents on Oct. 24, 2001(310) as of 9:42 pm(320B).

Figure 11:
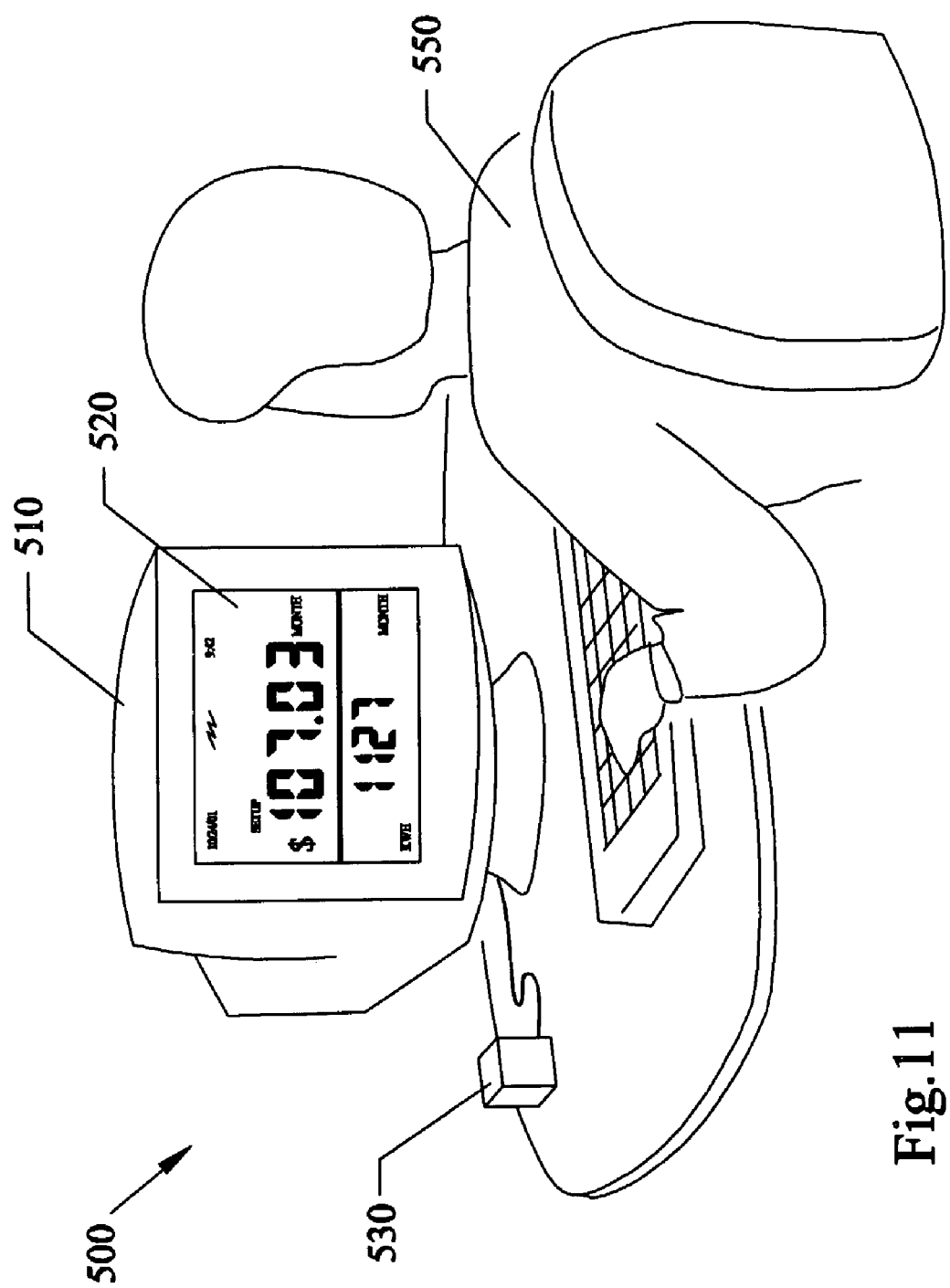
FIG. 11 is another embodiment of the receiver/monitor used with a personal computer.

FIG. 11 is another embodiment 500 of the receiver/monitor screens described above in reference to FIGS. 7–10 to be programmed into a personal computer 510 such as but not limited to a Pentium 4, and the like. Here a portable RF receiver 530 can receive the wireless signals from exterior monitor unit 100 shown in FIGS. 1–6, and the user can selectively program the novel invention. The novel invention can be used with a PC 510 to display various data such as but not limited to monthly power bills to date, the last 24 hour power consumption and/or billing costs to date, and the like.

The invention has numerous advantages and benefits over prior devices such as:
1. Allows the homeowner to monitor instantaneous power usage, history, and projected future use.
2. A key feature is that power usage can be determined instantaneously instead of having to wait for the black on the disk to pass by the detector. In low usage conditions, this could take a relatively long time.
3. Does not require installation by electrician or power company employee.
4. Installation does not require power to the home to be interrupted.
5. Wireless interface allows indoor unit to be mounted in a centralized, conspicuous location in the home so all family members can become more aware of power usage.
6. Budget LED's allow "at a glance" indication of whether the homeowner is on-track to meet his monthly energy cost goal.
7. Sensor design is easy to install and align due to lens design and use of alignment LED's.
8. Sensor design does not obstruct the power meter to allow for easy access by the power company meter reader or emergency personnel.
9. Can be sold as a kit which is easy to install and setup by a typical homeowner.

The operation of the invention will now be described in reference to power calculations, velocity measurements, and camera-sensor calibration and alignment.

For power calculations, the outdoor monitor unit 100 and indoor receiver/display unit 200 allows for the home owner customer to see in real-time the direct relationship between the rotations of the disk in the power meter to the amount of energy being consumed by the homeowner. This relationship is the Watt-hour Constant or Kh and is printed on the outside face of all power meters. The second is that for the typical residential customer, the total amount due at the end of the month including fees and taxes is proportional to the total energy used during the month. Therefore, using the following three inputs, the cost of energy per disk revolution can be calculated:

$Kh$=Watt-Hour constant=7.2 watt-hours/revolution $B$=Amount of last month's bill=$183

KWh=Kilowatt-hours used last month=2116 KWh

Cost per Kilowatt-hour=$B$/KWh=$183/2116 KWh=$0.0865/KWh

Therefore, the cost of one disk revolution is:

$$\text{Cost} = \frac{Kh \text{ Watt-hour}}{\text{Revolution}} * \frac{\$0.0865}{\text{kW-hour}} * \frac{1 \text{ kW}}{1000 \text{ W}} =$$

$$(7.2 * \$0.0865)/1000 = \$0.0006228/\text{revolution}$$

However, since we are measuring actual disk velocity, we don't need to wait for the disk (40 FIG. 2) to complete one revolution. A 3⅝" diameter disk has a circumference of 11.39 inches at the edge of the disk which corresponds to about $0.0005468/inch. If the disk is turning at 1 revolution every 10 seconds (6 RPM), the velocity at the outer edge is about 1.14 inches/second, well within the 14 inches/second specification for the CCD camera sensor 124(FIG. 3). Therefore, in one second, the disk will turn 1.14 inches corresponding to about $0.000623 in energy cost.

A preferred embodiment of using the novel invention to determine velocity measurements will now be described. The sensor (CCD sensor 124 FIG. 3) can continuously takes digital images of the disk (40 FIG. 3) at a rate of up to 2300 frames per second. The sensor (CCD sensor 124 FIG. 3) then uses an "Optical Navigation Engine" which is shown and described by U.S. Pat. No. 5,644,139 which describes a "Navigation Technique for Detecting Movement of Navigation Sensors Relative to an Object" which is incorporated by reference. The "Optical Navigation Engine" employs a technique called "optical two-dimensional auto-correlation" that essentially tracks common features in sequential images to determine the magnitude of movement in each dimension. In addition, the information can also be generated on image quality including gain levels, pixel ranges, and the like. This information can be used to control illumination levels and gauge measurement accuracy. The sensor (CCD sensor 124 FIG. 3) continuously updates the x and y movement data from the last time the sensor was read. This information can then be sent to the indoor receiver/monitor unit 200 to calculate the total movement vector based on the Pythagorean Theorem $x^2+y^2=z^2$, where z is the movement in the angular direction of arc tan (x/y). The velocity is calculated by computing the $\Delta z$/(time between two consecutive images), where $\Delta z$ is the z measured from two consecutive images. The result is a measure of velocity of the disk measured at a particular radius from the center of the moving disk. A calibration procedure will scale the velocity to a monetary value per rotational rate.

An optional sensor calibration and alignment can be used with the invention.

Note in the example given above, if we measure velocity ½-inch from the edge of the disk, the velocity drops to about 0.825 inches/second. The illumination LED (R LED 126 FIG. 3) can be used to help the user point the camera(CCD sensor 124 FIG. 3) at a location approximately one-half inch from the edge of the disk (40 FIG. 3). An optional calibration button(189 FIG. 2) can be pressed when the black stripe on the edge of the disk(40 FIG. 3) crosses the center of the front edge of the meter (30 FIG. 3). After one complete revolution, the button (189 FIG. 3) can be released, thus indicating one complete revolution. The circumference of the disk at the exact point of focus can now be calculated for use in the formulas above.

Although the preferred embodiment describes the novel invention for use with reading outdoor electrical meters, the invention can be used to read other meters such as but not limited to water meters, and the like, and any other types of meters that can use a rotating wheel configuration.

An optional KYZ pulse input can be used for reading nonrotating disk power meters.

The optional personal computer interface can be utilized to allow the device to interface with home security systems and smart home technologies.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of monitoring energy usage in real-time, comprising the steps of:
    mounting a meter reader sensor spaced apart from a utility meter;
    detecting speed of a rotating utility meter disk in the meter with the sensor;
    remotely transmitting in open air the speed of the rotating disk; and
    displaying energy usage on a display that receives the open air speed transmission.

2. The method of claim 1, wherein the detecting speed step includes the step of:
    sensing up to approximately 100 frame pictures per second of the rotating meter disk.

3. The method of claim 2, wherein the step of sensing includes the step of:
    sensing up to approximately 2300 frame pictures per second.

4. The method of claim 1, wherein the mounting step includes the step of:
    mounting a rotatable arm to a wall adjacent to the utility meter, the arm having a perpendicular position with the sensor attached to an end of the arm, and the sensor being adjacent to and above the meter, and the arm being rotatable to an extended position with the arm rotated outward to extend away from the meter.

5. The method of claim 4, further comprising:
    sliding the sensor in a horizontal direction relative to the arm; and
    rotating the sensor relative to the end of the arm.

6. The method of claim 1, wherein the remotely transmitting step includes the step of:
    powering the transmitter with solar power.

7. The method of claim 1, wherein the remotely transmitting step includes the step of:
    powering the transmitter with a battery.

8. The method of claim 1, wherein the displaying step includes the step of:
    displaying monthly energy usage to date.

9. The method of claim 1, wherein the displaying step includes the step of:
    displaying last 24 hour energy usage.

10. The method of claim 1, wherein the displaying step includes the step of:
    displaying monthly energy billing cost usage to date.

11. The method of claim 1, wherein the displaying step includes the step of:
    displaying last 24 hour billing cost usage.

12. The method of claim 1, wherein the energy meter is selected from at least one of: a power meter and a water meter.

13. The method of claim 1, further comprising the step of:
    shielding the energy meter from adverse weather conditions.

14. A real time energy usage meter reader, comprising:
    means for mounting a meter reader sensor spaced apart from a utility meter;
    means for detecting speed of a rotating utility meter disk in the meter with the sensor;
    means for remotely transmitting in open air the speed of the rotating disk; and
    means for displaying energy usage that receives the open air speed transmission.

15. The meter reader of claim 14, wherein the sensing means includes:
    means for sensing up to approximately 100 frame pictures per second of the rotating meter disk.

16. The meter reader of claim 14, wherein the sensing means includes:
    means for sensing up to approximately 2300 frame pictures per second.

17. The meter reader of claim 14, wherein the sensing means includes:
    a digital sensor camera.

18. The meter reader of claim 14, wherein the mounting means includes:
    a rotatable arm mounted to a wall adjacent to the utility meter, the arm having a perpendicular position with the sensor attached to an end of the arm, and the sensor being adjacent to and above the meter, and the arm having an extended position with the sensor positioned away from the meter.

19. The meter reader of claim 18, wherein the mounting means further includes:
   means for sliding the sensor in a horizontal direction relative to the arm; and
   means for rotating the sensor relative to the end of the arm.

20. The meter reader of claim 14, wherein the remotely transmitting means includes:
   a wireless transmitter with a non hardwired power source.

21. The meter reader of claim 20, wherein the power source includes:
   solar power.

22. The meter reader of claim 20, wherein the power source includes:
   a battery.

23. The meter reader of claim 15, wherein the displaying means includes:
   a liquid crystal(LCD) display.

24. The meter reader of claim 15, wherein the displaying means includes:
   means for displaying at least one of energy usage and energy billing costs.

25. The meter reader of claim 14, wherein the utility meter is selected from at least one of: a power meter and a water meter.

26. The meter reader of claim 18, further comprising:
   a protective shield for shielding the meter from adverse weather conditions.

* * * * *